United States Patent [19]

Bando et al.

[11] 4,325,452
[45] Apr. 20, 1982

[54] WORK VEHICLE

[75] Inventors: Niro Bando, Sakai; Haruo Watanabe, Izumi; Junji Miyata, Koaza-yakimachi, all of Japan

[73] Assignee: Kubota Ltd., Japan

[21] Appl. No.: 126,106

[22] Filed: Feb. 29, 1980

[30] Foreign Application Priority Data

Mar. 5, 1979 [JP] Japan .................. 54-25741

[51] Int. Cl.³ ............................................ B60K 25/00
[52] U.S. Cl. ........................................ 180/306; 60/488
[58] Field of Search ................ 180/306, 307, 308; 60/488, 464, 378, 475, 456

[56] References Cited

U.S. PATENT DOCUMENTS

| | | | |
|---|---|---|---|
| 3,148,502 | 9/1964 | Granryd | 60/396 |
| 3,185,241 | 5/1965 | Jackson | 180/307 X |
| 3,646,596 | 2/1972 | Bauer | 60/488 |

Primary Examiner—John A. Pekar

[57] ABSTRACT

A work vehicle comprising a stepless hydraulic speed change apparatus, a radiator for cooling hydraulic fluid for the said apparatus, a hydraulic cylinder for actuating a work implement, and a hydraulic pump provided with a suction portion. A return flow path is provided for supplying hydraulic fluid from the radiator to the suction portion of the oil pump.

2 Claims, 3 Drawing Figures

WORK VEHICLE

BACKGROUND OF THE INVENTION

This invention relates to a work vehicle such as a tractor having a stepless hydraulic speed change apparatus, a radiator through which hydraulic fluid from the stepless hydraulic speed change apparatus is circulated to be cooled, and a hydraulic cyclinder for actuating a work implement.

FIG. 3 shows a hydraulic circuit of a prior art tractor having the elements mentioned above. In the prior art construction a return flow path 4' for the hydraulic fluid from a radiator 2 is connected to a transmission case 7. A hydraulic actuating system for travelling and an hydraulic actuating system for a work implement are constituted separately in the prior art, thus requiring a separate hydraulic pump having an appropriate and high capacity for positively actuating the work implement. In FIG. 3, the other elements are the same as those of this invention and accordingly description concerning the elements indicated by numerals is omitted here since such will be understood from the following detailed description of this invention.

SUMMARY OF THE INVENTION

The objects of this invention are to provide an improved hydraulic supply system utilizing the above mentioned elements or apparatus, and enable a minimum or small capacity hydraulic pump to be employed for actuating the work implement, and, also to increase efficiency of the hydraulic pump.

To achieve the above objects, a work vehicle of this invention comprises a stepless hydraulic speed change apparatus, a radiator for cooling hydraulic fluid from the apparatus, a hydraulic cylinder for actuating a work implement, a hydraulic pump for supplying pressurized hydraulic fluid to the hydraulic cylinder, this pump being provided with a suction portion connected to the radiator, and a return flow path connected to the suction portion and at the other end to the stepless hydraulic speed change apparatus whereby the hydraulic pump is supplied with cooled and pressurized hydraulic fluid pumped by the hydraulic speed change apparatus.

Namely, the efficiency of the hydraulic pump is increased by supplying the pump with hydraulic fluid under pressure pumped by the stepless hydraulic speed change apparatus via the return flow path. As a result, sufficient pressure and flow of hydraulic fluid to the hydraulic cylinder is obtained, even if a minimum or small capacity hydraulic pump is utilized.

BRIEF DESCRIPTION OF THE DRAWINGS

The drawings shown an embodiment of a work vehicle according to this invention in which.

DETAILED DESCRIPTION OF THE PREFERRED EMBODIMENT

Figure 1:
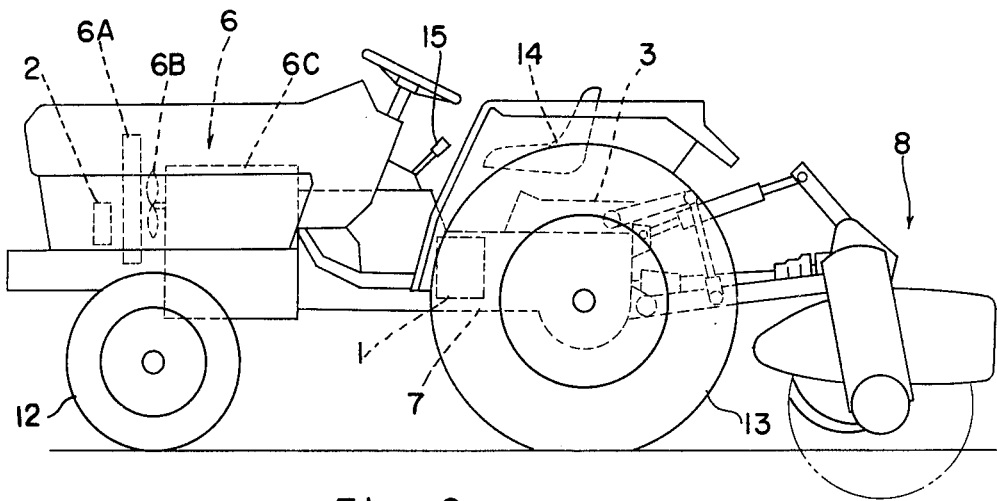
FIg. 1 shows a side view of the work vehicle.
Figure 2:
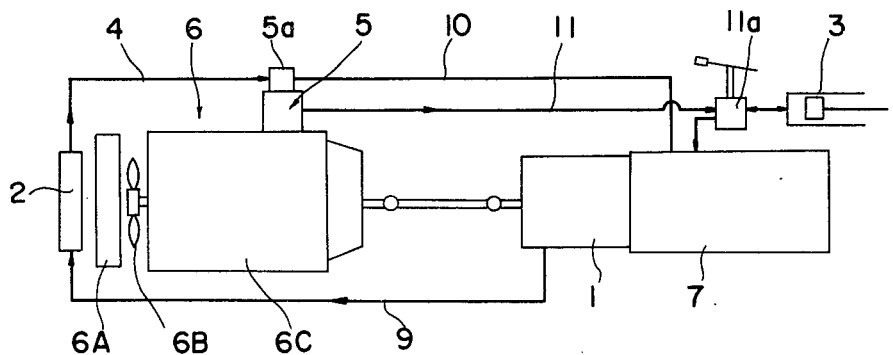
FIG. 2 shows a flow chart of the hydraulic fluid supply system.
Figure 3:
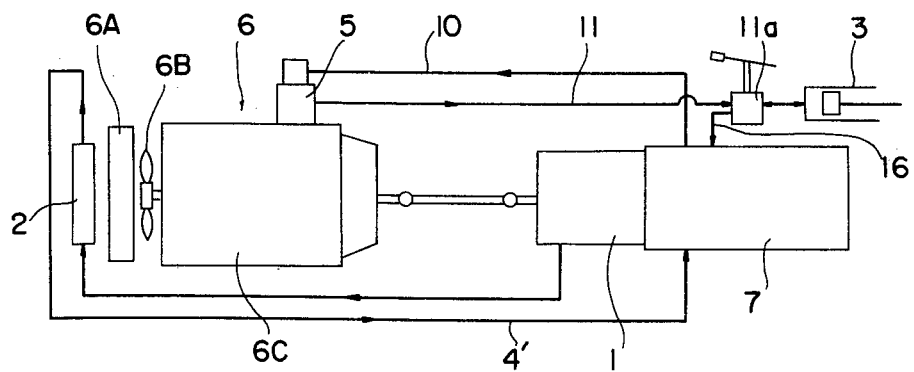
FIG. 3 shows a flow chart of the hydraulic supply system of the old aforementioned prior art work vehicle.

As shown in the drawings, a stepless hydraulic speed change apparatus 1 is disposed rearwardly of a prime mover unit 6, comprising a radiator 6A, a cooling fan 6B, and an engine 6C which are arranged in that order from the front of a tractor to the rear thereof. A transmission case 7 is attached to the rear of the stepless hydraulic speed change apparatus 1. Lubricating oil in the transmission case 7 is used as the hydraulic fluid for the stepless hydraulic speed change apparatus 1, the transmission case 7 being utilized as a storage tank for the hydraulic fluid used for the stepless hydraulic speed change apparatus 1. A radiator 2 is disposed in front of the radiator 6A to cool the oil pumped by the stepless hydraulic speed change apparatus 1. The prime mover unit 6 drives a hydraulic pump 5 which supplies hydraulic fluid under pressure to a hydraulic cylinder 3 of single action type which is employed for raising and lowering a rotary cultivator or other ground work implement 8 mounted on the rear portion of the tractor. A return flow path 4 extends between a suction portion 5a of the hydraulic pump 5 and the radiator 2. A flow path 9 is provided to supply hydraulic fluid from the stepless hydraulic speed change apparatus 1 to the radiator 2. A return flow path 10 is provided to connect the transmission case 7 with the suction portion 5a of the hydraulic pump 5. A supply flow path 11 provided with a control valve 11a connects the hydraulic pump 5 with the hydraulic cylinder 3. In the drawings, 12 and 13 show front wheels and rear wheels respectively. 14 is a driver's seat, and 15 is an operating lever for the stepless hydraulic speed change apparatus 1.

According to the construction as described above, when the volume of hydraulic fluid from the stepless hydraulic speed change apparatus 1 via the radiator 2 is greater than the output of the hydraulic pump 5, any excess of hydraulic fluid flowing into the suction portion 5a from the radiator 2 directly returns into the transmission case 7 via the flow path 10. Further, when the volume of hydraulic fluid from the stepless hydraulic speed change apparatus 1 to the radiator 2 is less than the output of the hydraulic pump 5, hydraulic fluid in the transmission case 7 flows reversely along the flow path 10 and any lack of hydraulic fluid for the hydraulic pump 5 is supplied. In either case, hydraulic fluid under pressure is supplied to the hydraulic pump 5 by the stepless hydraulic speed change apparatus 1.

In the prior art construction the circuit for the radiator 2 and the circuit for the hydraulic cylinder 3 are independent of each other and therefore greater power is required to circulate hydraulic fluid through the two separate circuits. This invention, however, minimizes the power required for hydraulic fluid circulation by decreasing a total amount of the circulating hydraulic fluid and utilizing the hydraulic fluid supplied to the radiator 2 as the supply for the hydraulic cylinder 3, while additionally effecting cooling of the hydraulic fluid.

Additionally, it is possible to simplify the hydraulic fluid return path and to cut a cost down by making the return flow path 4 from the radiator 2 to the transmission case 7 shorter than that in the prior art.

We claim:

1. A work vehicle comprising a drive motor, a hydraulic stepless speed change apparatus, a transmission housing attached to said stepless speed change apparatus and containing therein a transmission apparatus, said stepless speed change apparatus utilizing lubricating fluid in said transmission housing as actuating fluid therefor, a radiator mounted on the vehicle, a conduit for supplying fluid heated by said stepless speed change apparatus to said radiator, a serially arranged conduit for supplying fluid cooled by said radiator to an inlet of a hydraulic pump driven by said motor, a conduit interposed between said inlet of said hydraulic pump and said transmission housing to return excess fluid to said transmission housing from said inlet or to supply deficient fluid to said inlet from said transmission housing, a conduit for supplying pressurized fluid from said pump to a control valve for a hydraulic working cylinder, and a conduit for returning fluid to said transmission housing from said pump or from said working cylinder via said control valve.

2. The work vehicle of claim 1 further comprising a cooling fan located at a front portion of the drive motor, and wherein the radiator and the stepless hydraulic speed change apparatus are separately disposed at the front and rear of the drive motor.

* * * * *